(12) United States Patent
Chen

(10) Patent No.: US 12,528,322 B1
(45) Date of Patent: Jan. 20, 2026

(54) HITCH ASSEMBLY

(71) Applicant: Shanghai Oceania International Co., Ltd., Shanghai (CN)

(72) Inventor: Alexander Yebo Chen, Lake Forest, CA (US)

(73) Assignee: Shanghai Oceania International Co., Ltd., Shanghai (CN)

( * ) Notice: Subject to any disclaimer, the term of this patent is extended or adjusted under 35 U.S.C. 154(b) by 0 days.

(21) Appl. No.: 19/098,262

(22) Filed: Apr. 2, 2025

(30) Foreign Application Priority Data

Nov. 5, 2024 (CN) .......................... 202430698721.9
Dec. 19, 2024 (CN) .......................... 202423136913.4

(51) Int. Cl.
  *B60D 1/46* (2006.01)
  *B60D 1/42* (2006.01)

(52) U.S. Cl.
  CPC . *B60D 1/46* (2013.01); *B60D 1/42* (2013.01)

(58) Field of Classification Search
  CPC .................................... B60D 1/46; B60D 1/42
  See application file for complete search history.

(56) References Cited

U.S. PATENT DOCUMENTS

| | | | | |
|---|---|---|---|---|
| 3,865,406 A * | 2/1975 | Dutton | ..................... | B60D 1/46 |
| | | | | 280/490.1 |
| 6,789,815 B2 * | 9/2004 | Moss | ....................... | B60D 1/06 |
| | | | | 280/491.1 |
| 6,908,099 B2 * | 6/2005 | Andersen | ................. | B21K 1/76 |
| 6,974,148 B2 * | 12/2005 | Moss | ....................... | B60D 1/54 |
| | | | | 280/511 |
| 8,408,577 B2 * | 4/2013 | Works | ...................... | B60D 1/46 |
| | | | | 280/491.1 |
| D747,239 S * | 1/2016 | Wyers | ......................... | D12/162 |
| D997,045 S * | 8/2023 | Li | ............................... | D12/162 |
| 12,304,258 B1 * | 5/2025 | Yan | ......................... | B60D 1/06 |
| 2024/0140148 A1 * | 5/2024 | Tang | ........................ | B60D 1/06 |
| 2025/0115086 A1 * | 4/2025 | Jacobs | ..................... | B60D 1/06 |

* cited by examiner

*Primary Examiner* — Valentin Neacsu
*Assistant Examiner* — Marlon A Arce

(57) ABSTRACT

The present disclosure aims to provide a hitch assembly comprising: a connection module, a towing module, and a positioning unit. The connection module includes a connection segment and a longitudinal arm, with first positioning grooves and second positioning grooves formed on both sides of the longitudinal arm. The towing module contains first positioning bores and second positioning bores. When the towing module moves along the extension direction of the longitudinal arm, pairs of first positioning bores align with first positioning grooves at distinct positions, while corresponding pairs of second positioning bores simultaneously align with second positioning grooves. The aligned first positioning bores and first positioning grooves define passages for receiving positioning members, and the aligned second positioning bores and second positioning grooves similarly form passages for positioning member insertion. This configuration provides the hitch assembly with adjustable ball head height and enhanced structural integrity.

8 Claims, 7 Drawing Sheets

HITCH ASSEMBLY

CROSS-REFERENCE TO RELATED APPLICATIONS

The application claims priority of Chinese patent application CN 202430698721.9, filed on Nov. 5, 2024, and also claims priority of Chinese patent application CN202423136913.4, filed on Dec. 19, 2024, which are incorporated herein by reference in its entireties.

TECHNICAL FIELD

The present disclosure relates to the technical field of vehicle coupling components, in particular to hitch assembly.

BACKGROUND

Trailers are a vital means of modern cargo transportation. A trailer connects to a towing vehicle via a hitch assembly, with cargo loaded onto the trailer for transport.

Current mainstream hitch assemblies adopt a ball-type design, comprising a connection arm and a ball head. The towing vehicle typically contains a receiver cavity or tube, where the connection arm is inserted and secured. The ball head connects to the trailer. To accommodate varying trailer and towing vehicle structures, there is a demand for adjusting the ball head to different heights. Existing solutions often use a split structure between the connection arm and ball head, with multiple through bores drilled along the connection arm at varying heights. Locking pins then fix the ball head to the desired position.

However, inventors have identified that through bores in the connection arm compromise its structural integrity. Given that trailers may carry loads exceeding tens of tons, developing a height-adjustable ball head mechanism without sacrificing strength remains an urgent technical challenge.

SUMMARY

The objective of this disclosure is to provide a hitch assembly with adjustable ball head height and enhanced structural strength.

A hitch assembly achieving the aforementioned objective comprises:
a connection module including:
a connection segment through which the hitch assembly connects to a towing vehicle; and
a longitudinal arm having multiple first positioning grooves and second positioning grooves spaced along its longitudinal direction, the longitudinal arm defining oppositely disposed first and second sides, the connection segment being connected to the longitudinal arm at the first side, the first positioning grooves being formed at the first side and the second positioning grooves at the second side;
a towing module including:
at least one towing head for connecting a towed object to the hitch assembly;
a pair of first positioning bores at a first position;
a pair of second positioning bores at a second position; and
a positioning unit providing at least two positioning members for connecting the towing module to the connection module;

wherein when the towing module moves along the longitudinal arm, the pair of first positioning bores align with different first positioning grooves while the pair of second positioning bores simultaneously align with corresponding second positioning grooves, the aligned first positioning bores and first positioning grooves defining channels for receiving the positioning members, and the aligned second positioning bores and second positioning grooves similarly defining channels.

In one or more embodiments, the longitudinal arm has a thickness between its first and second sides, with the depth of both first and second positioning grooves being no less than one-quarter of said thickness.

In one or more embodiments, a sliding channel is formed in one of the longitudinal arm or towing module, and a protrusion is provided on the other, the protrusion being slidably engaged with the sliding channel to guide movement of the towing module along the longitudinal arm.

In one or more embodiments, the connection module is an L-shaped bracket, the connection segment being a transverse arm vertically extending from an end of the longitudinal arm, the L-shaped bracket defining a space at the first side of the longitudinal arm for accommodating the towing module; wherein the sliding channel is formed in the longitudinal arm, and the protrusion is a pivot shaft disposed on the towing module.

In one or more embodiments, the hitch assembly has an operational state and a storage state, the towing module being positioned at the second side of the longitudinal arm in the operational state and at the first side in the storage state; wherein the positioning bores are configured such that:
In the operational state, the pair of first positioning bores align with different first positioning grooves to form channels while the pair of second positioning bores simultaneously align with corresponding second positioning grooves, allowing insertion of the positioning members to fix the towing module at varying positions;
The towing module pivots relative to the longitudinal arm to transition to the storage state, wherein the first positioning bores align with at least one second positioning groove while the second positioning bores align with corresponding first positioning grooves, allowing insertion of the positioning members to secure the towing module in storage.

In one or more embodiments, the towing module further includes a pair of third positioning bores that align with remaining first or second positioning grooves in the operational state to form additional channels for the positioning members; wherein the first, second, and third positioning bores are arranged in a triangular pattern on the towing module, with the pivot shaft located within the triangle.

In one or more embodiments, the towing module comprises a retainer frame connected to a towing head assembly, the retainer frame including a main body and a pair of side plates, the towing head assembly being connected to the main body, wherein in an assembled state, the side plates flank widthwise sides of the longitudinal arm, with the protrusions disposed thereon; the pair of first positioning bores and second positioning bores are respectively formed in the side plates, and the towing head assembly includes at least one towing head.

In one or more embodiments, the towing head assembly includes at least one clearance surface devoid of the towing head; wherein the towing head assembly is rotatably connected to the retainer frame, enabling the clearance surface to face the transverse arm during storage.

In one or more embodiments, the retainer frame includes a first fixing bore and a second fixing bore with mutually perpendicular axes, and the towing head assembly includes a third fixing bore; when the towing head assembly rotates relative to the retainer frame, the third fixing bore aligns with either the first or second fixing bore; the hitch assembly further includes an alignment pin insertable into aligned third and first fixing bores or third and second fixing bores.

In one or more embodiments, the positioning unit includes at least two pins serving as the positioning members.

The advantages of this disclosure include:

By configuring multiple first and second positioning grooves, the towing module can be fixed at varying vertical heights through alignment of positioning bores and grooves, adapting to diverse towing vehicles and trailers while maintaining structural integrity.

The foregoing description outlines the technical solutions of this application. To better understand the technical means, embodiments are described with reference to the specification. To clarify the objectives, features, and advantages of this application, specific implementations are provided below.

DETAILED DESCRIPTION

The embodiments of the technical solutions of this application will be described in detail below with reference to the accompanying drawings. The following embodiments are provided solely to illustrate the technical solutions of this application more clearly, and therefore serve only as examples without limiting the scope of protection.

Unless otherwise defined, all technical and scientific terms used herein have the same meanings as commonly understood by those skilled in the technical field of this application. The terminology used herein is for the purpose of describing specific embodiments only and is not intended to limit this application. The terms "comprise" and "have" in the specification and claims of this application, as well as any variations thereof in the above figure descriptions, are intended to cover non-exclusive inclusion.

In the description of the embodiments of this application, technical terms such as "first XX" and "second XX" (e.g., "first positioning groove", "second positioning groove") are used solely to distinguish different objects, and should not be construed as indicating or implying relative importance, or implicitly specifying the quantity, specific sequence, or hierarchy of the indicated technical features.

Figure 1:
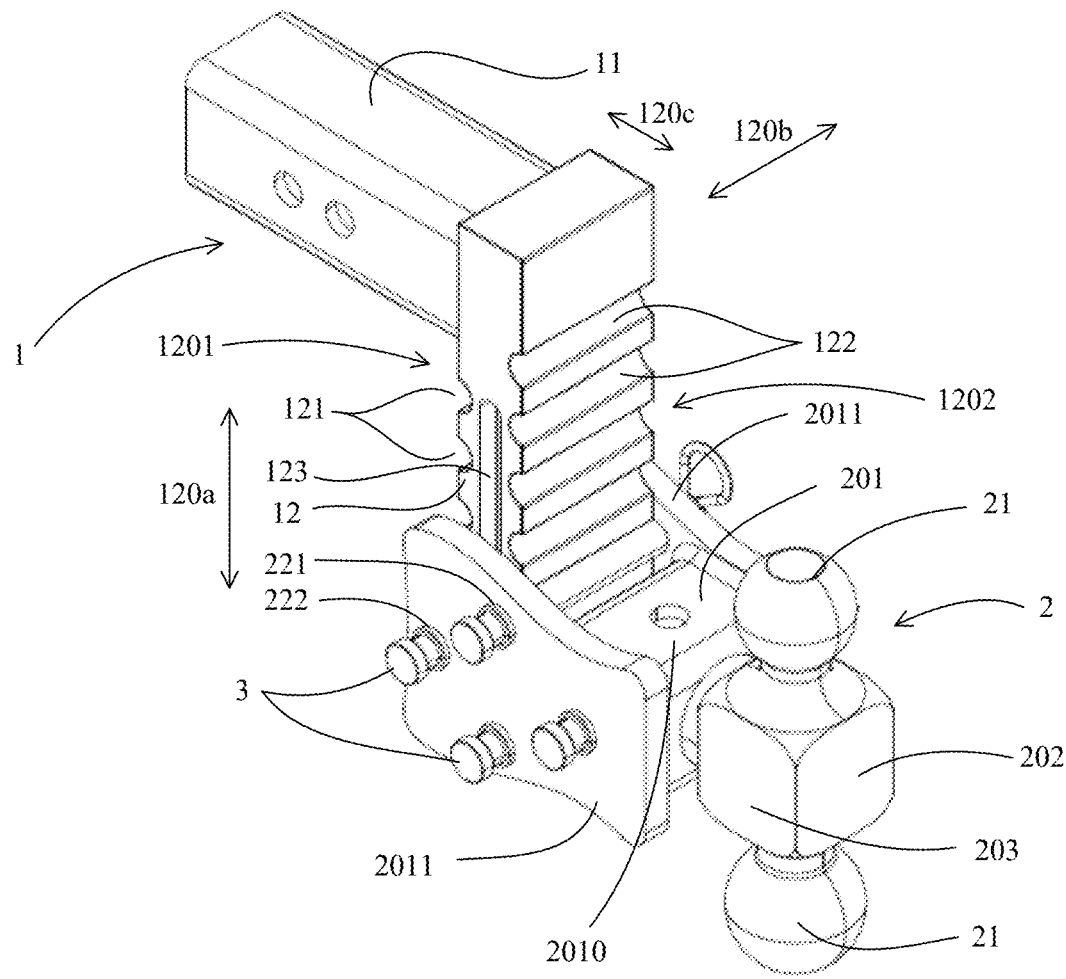
FIG. 1 is a perspective schematic diagram of a hitch assembly according to some embodiments.
Figure 2:
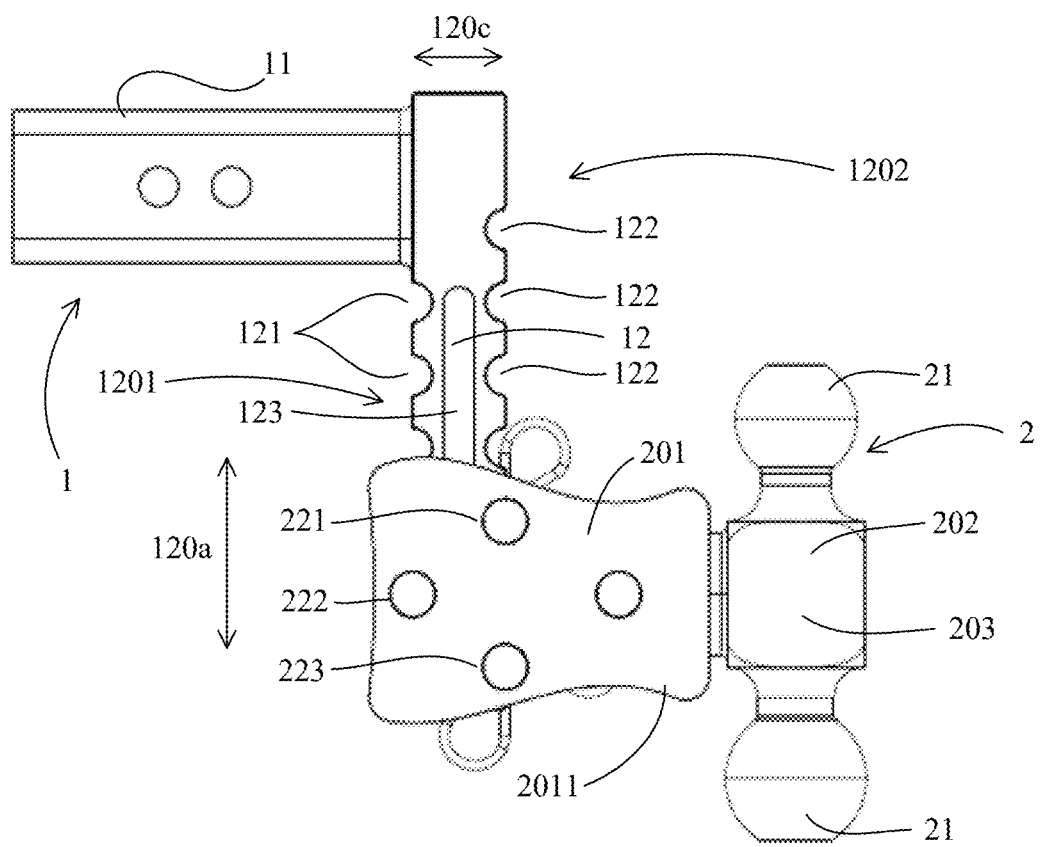
FIG. 2 is a front schematic diagram of the hitch assembly according to some embodiments.
Figure 3:
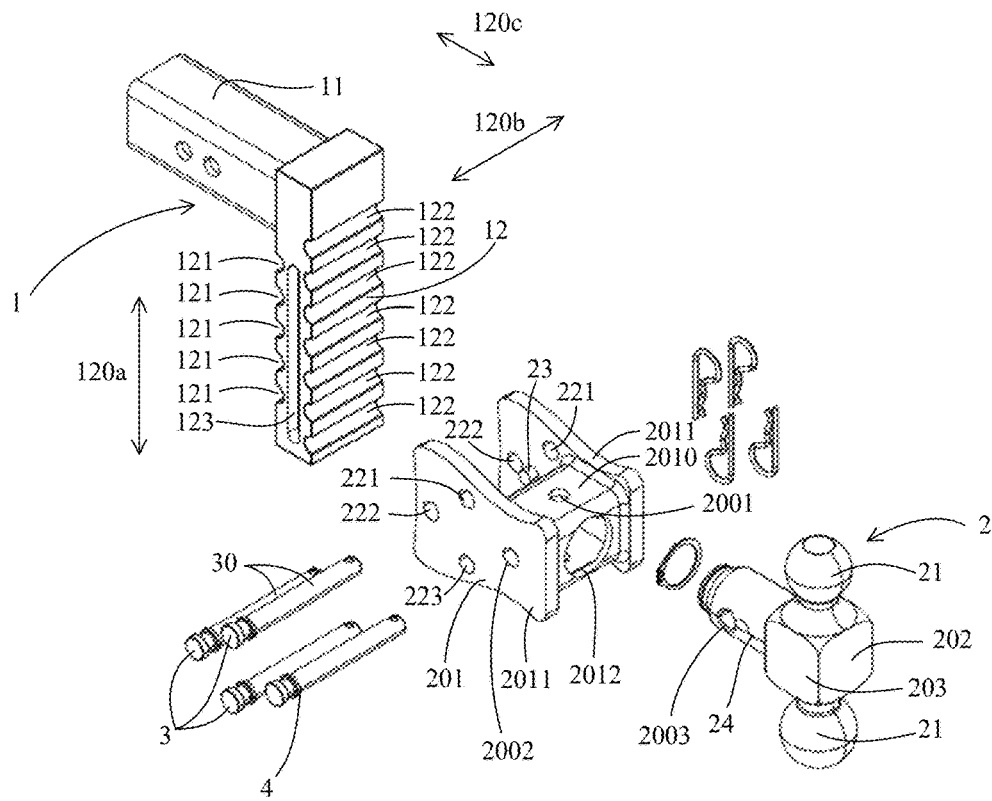
FIG. 3 is an exploded schematic diagram of the hitch assembly according to some embodiments.
Figure 4:
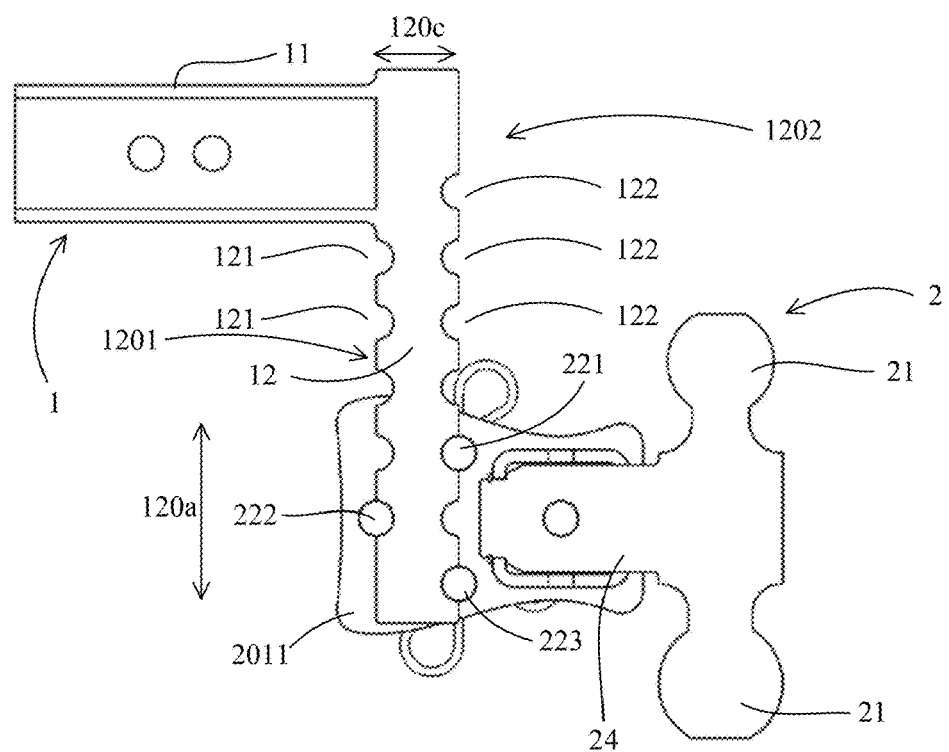
FIG. 4 is a half-sectional schematic diagram of the hitch assembly according to some embodiments.

To provide a trailer coupling device with adjustable ball head height and enhanced strength, a hitch assembly is provided according to some embodiments of this disclosure. FIG. 1 is a perspective schematic diagram of the hitch assembly according to some embodiments, FIG. 2 is a front schematic diagram of the hitch assembly according to some embodiments, FIG. 3 is an exploded schematic diagram of the hitch assembly according to some embodiments, and FIG. 4 is a half-sectional schematic diagram of the hitch assembly according to some embodiments.

The hitch assembly comprises a connection module 1, a towing module 2, and a positioning unit 3. The connection module 1 includes a connection segment 11 and a longitudinal arm 12. The hitch assembly is connected to a towing vehicle through the connection segment 11, for example, by fixing the connection segment 11 to the towing vehicle using fasteners such as bolts.

The longitudinal arm 12 includes a plurality of first positioning grooves 121 and second positioning grooves 122. The first positioning grooves 121 and second positioning grooves 122 are respectively formed on opposite sides of the longitudinal arm 12. Specifically, the longitudinal arm 12 includes oppositely disposed first side 1201 and second side 1202. The connection segment 11 is connected to the longitudinal arm 12 at the first side 1201. The first positioning grooves 121 are formed on the first side 1201, while the second positioning grooves 122 are formed on the second side 1202. Both the first positioning grooves 121 and second positioning grooves 122 are distributed at intervals along the extension direction 120a of the longitudinal arm 12.

The towing module 2 includes at least one towing head 21, a pair of first positioning bores 221 at a first position, and a pair of second positioning bores 222 at a second position. A towed object (e.g., trailer) is connected to the hitch assembly through the towing head 21. The positioning unit 3 provides at least two positioning members 30 for connecting the towing module 2 to the connection module 1.

When the towing module 2 moves along the extension direction 120a of the longitudinal arm 12, the pair of first positioning bores 221 can align with different first positioning grooves 121, while the pair of second positioning bores 222 simultaneously align with corresponding second positioning grooves 122. The positioning members 30 are configured to be inserted into the aligned first positioning grooves 121 with the pair of first positioning bores 221, and the aligned second positioning grooves 122 with the pair of second positioning bores 222, thereby securing the towing module 2.

Figure 5:
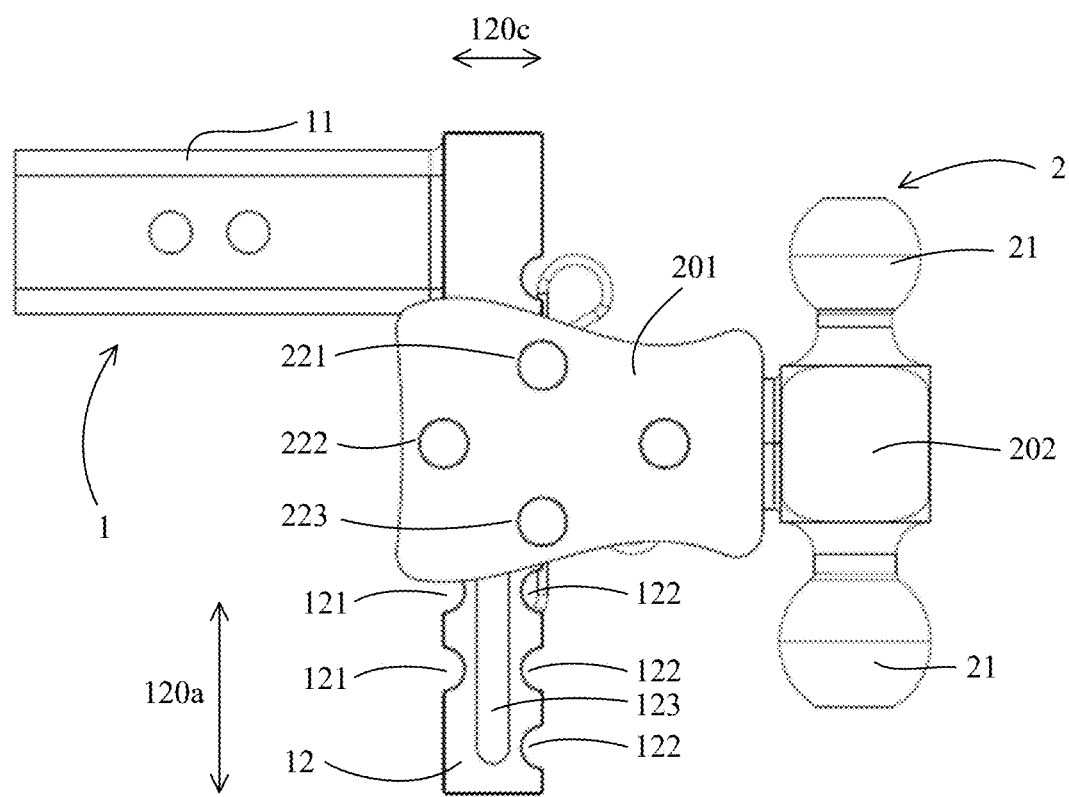
FIG. 5 is a schematic diagram of the hitch assembly positioned at different heights according to some embodiments.

Specifically, the aligned pair of first positioning bores 221 and first positioning grooves 121 define a channel for inserting the positioning member 30, while the aligned pair of second positioning bores 222 and second positioning grooves 122 define another channel. By inserting two positioning members 30 into these two channels respectively, the towing module 2 is fixed. By moving the pair of first positioning bores 221 to different positions and inserting the positioning members 30 into the aligned grooves and bores, the towing module 2 can be secured to the connection module 1 at various positions along the longitudinal arm 12. For example, in a specific embodiment, the towing head 21 shown in FIG. 2 is at a first height, while the towing head 21 in FIG. 5 is at a second height. Notably, the pair of first positioning bores 221 are coaxially arranged, and the pair of second positioning bores 222 are also coaxially arranged, with the first and second positioning bores positioned differently within the same plane.

By configuring multiple first positioning grooves 121 and second positioning grooves 122, the connection module 1 and towing module 2 can be fixed at different relative positions through alignment of corresponding grooves and bores followed by insertion of the positioning members 30. This enables vertical height adjustment of the towing module 2 to accommodate various configurations of towing vehicles and trailers.

Additionally, referring to FIG. 4 with the orientation of the hitch assembly as reference, when a towing vehicle pulls a trailer through the hitch assembly, the hitch assembly will experience leftward and rightward horizontal tensile forces. In this scenario, the primary load-bearing components are the leftmost positioning shaft 3 and longitudinal arm 12 shown in the figure. Therefore, the strength of the positioning shaft 3 and longitudinal arm 12 is critical to the overall structural integrity of the hitch assembly.

In conventional hitch assemblies, connection is achieved by forming through bores in the longitudinal arm and passing positioning shafts through these bores to link the towing head with the longitudinal arm. During towing in such conventional designs, the positioning shaft 3 abuts against the longitudinal arm 12 wall on one side of the through bore. While the inner diameter of through bores must be no smaller than the shaft diameter, the first positioning groove 121 and second positioning groove 122 in the disclosed hitch assembly only need to accommodate the positioning member 30. The groove depth has no strict correlation with the size/diameter of the positioning member 30. When using positioning members 30 of identical diameter, the wall thickness of the longitudinal arm 12 contacting the positioning member 30 in the disclosed configuration is substantially greater than that contacting the positioning shaft in conventional designs. Consequently, the overall structural strength of the disclosed hitch assembly surpasses traditional configurations.

The term "embodiment" as used herein indicates that specific features, structures, or characteristics described in connection with the embodiment may be incorporated in at least one embodiment of the application. The phrase appearing in various parts of the specification does not necessarily refer to the same embodiment, nor is it mutually exclusive or alternative to other embodiments. Those skilled in the art will explicitly and implicitly understand that the embodiments described herein may be combined with other embodiments.

In some embodiments of the present disclosure, the thickness of the longitudinal arm 12 is defined between the first side 1201 and second side 1202. The depth of the first positioning groove 121 and second positioning groove 122 is each less than one-quarter of the longitudinal arm's thickness. It should be noted that the directional reference for "longitudinal arm thickness" corresponds to the depth direction of both positioning grooves. As previously established, the longitudinal arm's strength is vital to the hitch assembly's overall structural integrity, and groove depth directly affects this strength. The described design ensures sufficient structural robustness of the longitudinal arm 12.

According to some specific embodiments of the present disclosure, as shown in the figures, the longitudinal arm 12 is substantially in a rectangular prism configuration, having an extension direction 120a (length direction), width direction 120b, and thickness direction 120c. The first positioning groove 121 and second positioning groove 122 extend along the width direction 120b of the longitudinal arm 12 and are formed through the longitudinal arm. Multiple first positioning grooves 121 and second positioning grooves 122 are arranged along the extension direction 120a of the longitudinal arm 12, with each adjacent pair of first positioning grooves 121 and second positioning grooves 122 being parallel.

It should be understood that in other embodiments differing from the illustrated configuration, the longitudinal arm 12 may adopt alternative suitable shapes, such as cylindrical. The extension directions of the first positioning groove 121 and second positioning groove 122 could also align with the thickness direction 120c as labeled in the figures.

In certain embodiments of the disclosure, as depicted, the first positioning groove 121 and second positioning groove 122 are arc-shaped grooves, correspondingly matched with cylindrical positioning shaft 3. In alternative embodiments, the first positioning groove 121 and/or second positioning groove 122 may adopt other suitable configurations such as rectangular grooves, tenon grooves, or compatible structures, with matching profiles for positioning shafts and bores. Compared to other groove configurations, arc-shaped grooves facilitate alignment.

In some embodiments, the longitudinal arm 12 incorporates a sliding channel 123 while the towing module 2 includes a protrusion 23. The protrusion 23 slidably engages with the sliding channel 123 to guide the towing module 2 along the extension direction 120a of the longitudinal arm 12. This configuration enhances alignment efficiency between positioning bores and positioning grooves.

Further, as illustrated, the connection module 1 is an L-shaped bracket where the connection segment 11 is a transverse arm orthogonally extending from the longitudinal arm 12. The space between the longitudinal arm 12 and transverse arm 11 accommodates the stored towing module 2, specifically forming a storage space on the first side 1201 of the longitudinal arm. The sliding channel 123 extends along the longitudinal arm's extension direction 120a, while the protrusion 23 is a pivot shaft on the towing module 2. Alternative embodiments may employ other connection segment structures for vehicle mounting.

Figure 6:
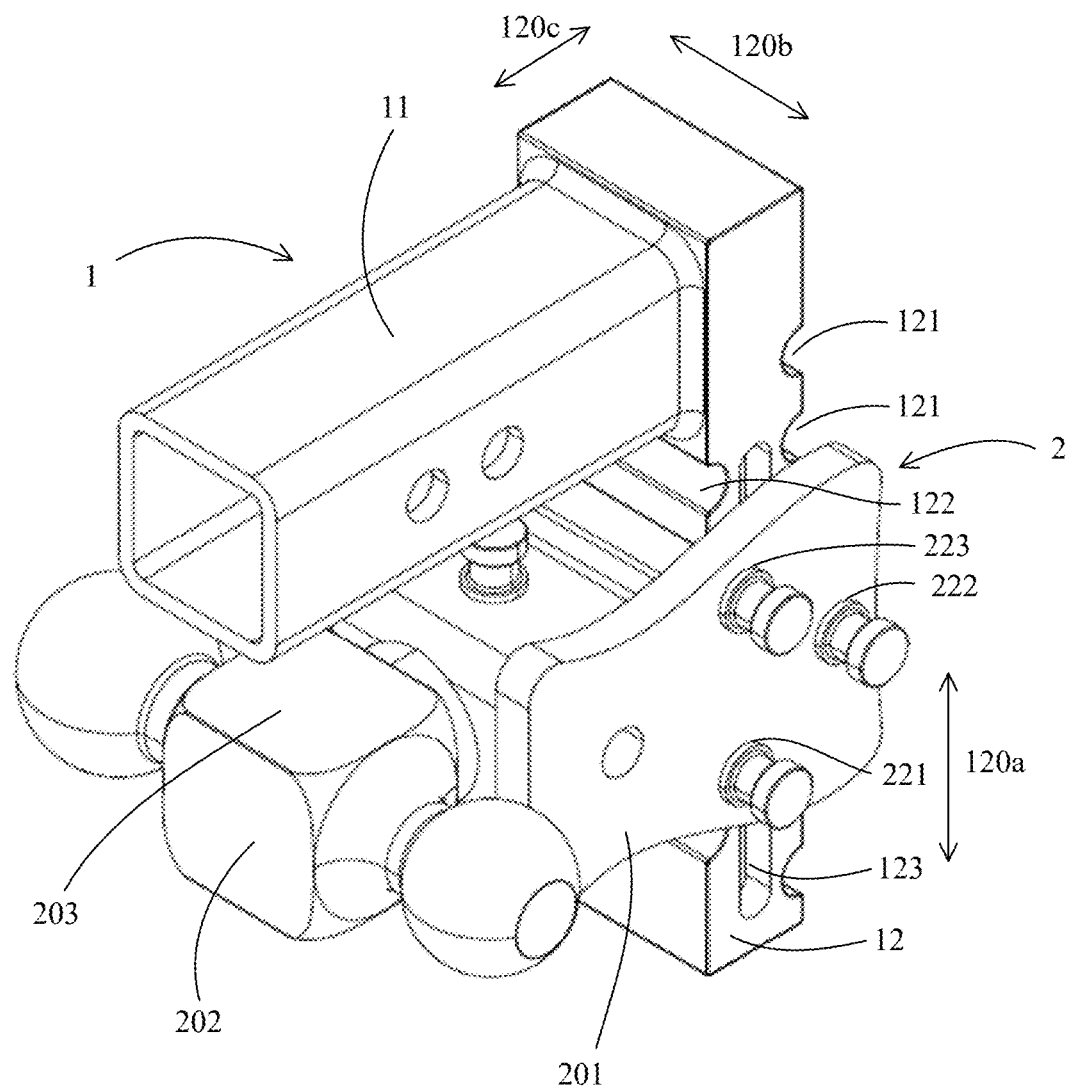
FIG. 6 is a perspective schematic diagram of the hitch assembly in a storage state according to some embodiments.
Figure 7:
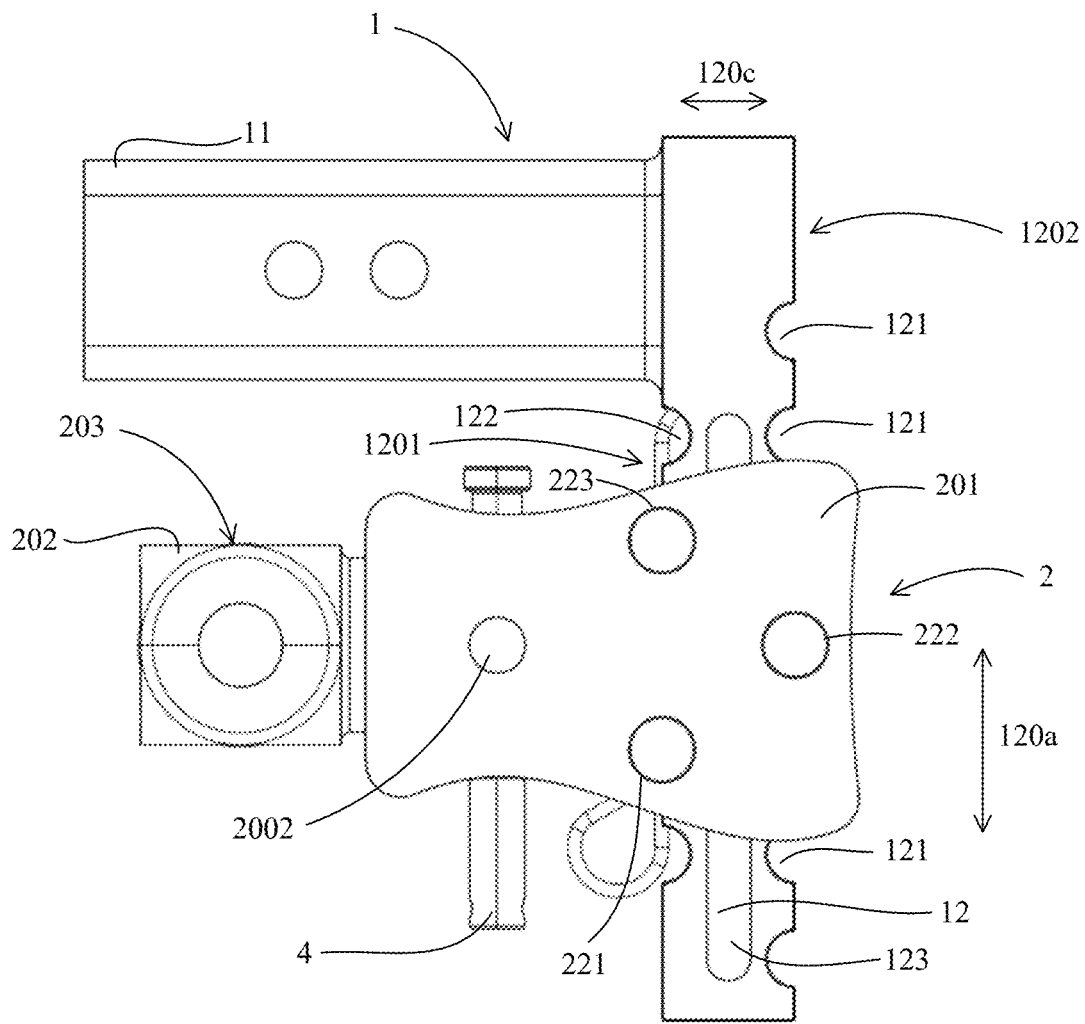
FIG. 7 is a front schematic diagram of the hitch assembly in the storage state according to some embodiments.
Figure 8:
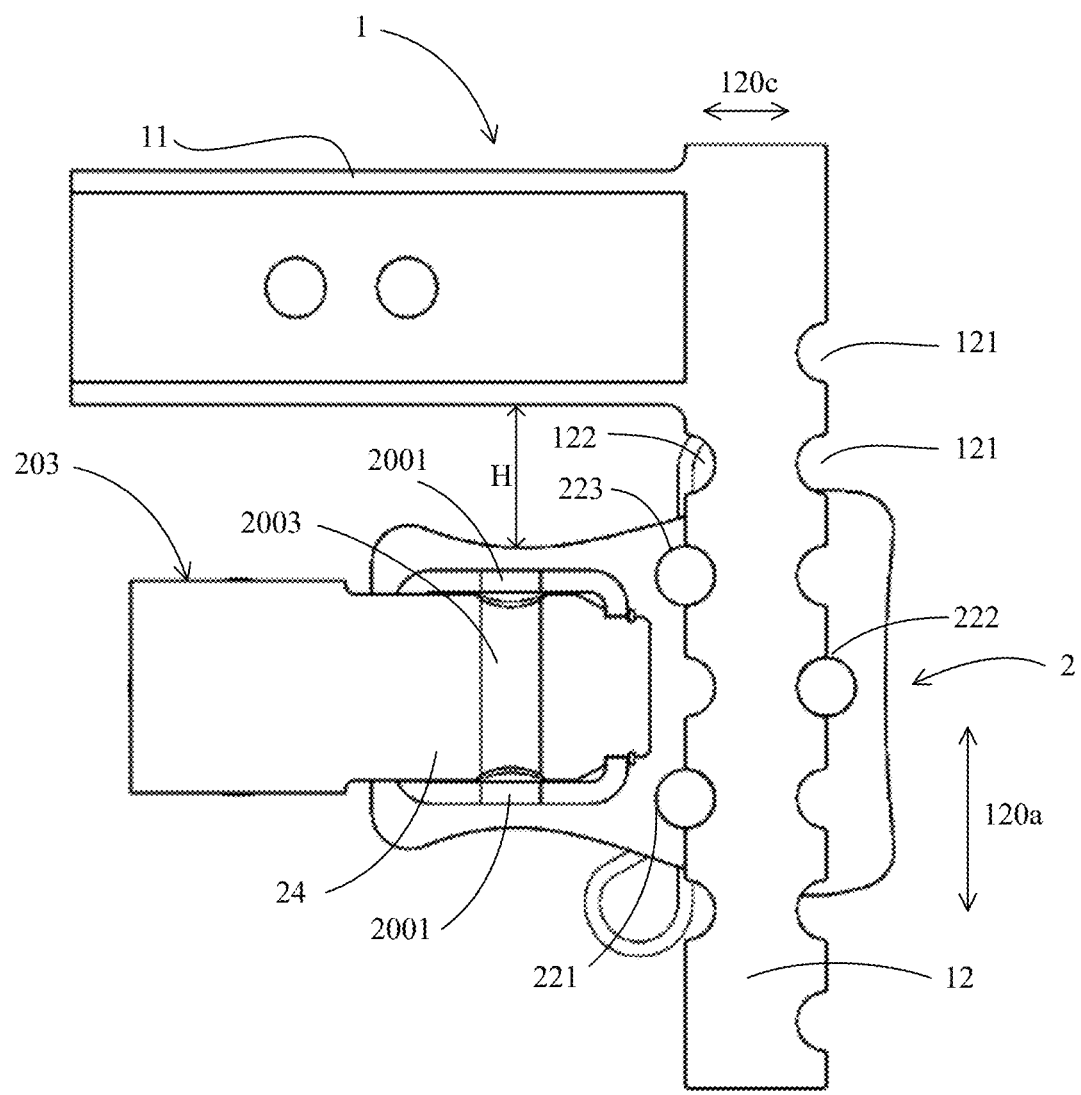
FIG. 8 is a half-sectional schematic diagram of the hitch assembly in the storage state according to some embodiments.

FIGS. 6-8 respectively show perspective, front, and semi-sectional views of the hitch assembly in storage state. The assembly transitions between operational and storage states: in storage (FIGS. 6-8), the towing module 2 resides within the space enclosed between the longitudinal arm 12 and transverse arm 11 (first side 1201); in operational mode (FIGS. 1-2), the towing module 2 locates externally on the longitudinal arm's second side 1202. The positioning bores are configured such that in operational state, paired first positioning bores 221 align with different first positioning grooves 121 to form a passage, while paired second positioning bores 222 align with corresponding second positioning grooves 122, enabling fixation via positioning member 30 insertion. During storage, the towing module 2 flips relative to the longitudinal arm 12, aligning first positioning bores 221 with second positioning grooves 122 and vice versa. In one embodiment, first and second positioning grooves 121/122 are symmetrically distributed on both longitudinal arm sides, while other embodiments may stagger them along the extension direction.

When vehicles equipped with the hitch assembly are not towing, protruding towing modules increase vehicle length during maneuvers like reversing. Complete disassembly requires reinstallation effort and storage space. The disclosed design allows flipping the towing module 2 into storage position, enhancing usability.

In alternative embodiments, the sliding channel may be implemented on the towing module 2 with protrusions on the longitudinal arm.

Further, some embodiments include paired third positioning bores 223 offset from first and second positioning bores 221/222. In operational state, paired first and third positioning bores 221/223 simultaneously align with different positioning grooves to form passages (FIG. 4). In storage state (FIG. 8), they align with second positioning grooves 122. The triangular arrangement of first, second, and third positioning bores 221/222/223 with pivot shaft 23 within the triangle (preferably equilateral with central pivot) resists torsional forces during diagonal loading, preventing pivot shaft 23 from bearing excessive loads.

Additionally, the towing module 2 comprises a retainer frame 201 and towing head subassembly 202. The retainer frame 201 includes a main body 2010 and paired side plates 2011 mounting dual protrusions 23. The longitudinal arm 12 positions between the side plates 2011 with sliding channel-protrusion engagement. The towing head subassembly 202 connects to the main body 2010, with positioning bores 221/222 on the side plates 2011 and at least one towing head 21. Alternative embodiments may integrate positioning bores and towing heads.

In a specific embodiment, the towing head subassembly 202 further comprises a connection shaft segment 24. The connection segment may adopt a cylindrical configuration as illustrated. A connection bore 2012 is formed in the main body 2010, enabling connection between the towing head subassembly 202 and the retainer frame 201 through insertion of the connection shaft segment 24 into the connection bore 2012.

Furthermore, in certain embodiments of the present disclosure, the towing head subassembly 202 includes at least one clearance surface 203 devoid of towing heads 21. The towing head subassembly 202 is rotatably connected to the retainer frame 201, achieved through rotational engagement of the cylindrical connection shaft segment 24 within the connection bore 2012. This configuration allows the towing head subassembly 202 to rotate when the towing module 2 is positioned between the longitudinal arm 12 and transverse arm 11, orienting the clearance surface 203 toward the transverse arm 11. Such arrangement prevents interference between protruding towing heads 21 and the transverse arm 11 in the storage position, resulting in reduced overall dimensions of the stowed hitch assembly.

Furthermore, in some embodiments of the disclosure, the retainer frame 201 incorporates a first fixing bore 2001 and second fixing bore 2002 with mutually perpendicular axes. The towing head subassembly 202 contains a third fixing bore 2023. When the towing head subassembly 202 rotates relative to the retainer frame 201, the third fixing bore 2023 becomes alignable with either the first fixing bore 2001 or second fixing bore 2002. The hitch assembly further comprises a positioning pin 4 configured for insertion into aligned pairs of third-first fixing bores or third-second fixing bores. This mechanism enables selective fixation of the towing head subassembly 202 in either storage or operational configurations.

Furthermore, in certain embodiments of the present disclosure as shown in FIG. 8, when the towing module 2 positioned between the longitudinal arm 12 and transverse arm 11 rotates to orient the clearance surface 203 of the towing head subassembly 202 toward the longitudinal arm 12, the third fixing bore 2023 aligns with the first fixing bore 2001. The axial direction of the aligned third fixing bore 2023 and first fixing bore 2001 parallels the extension direction 120a of the longitudinal arm 12. When the towing module is secured in the storage position, a first clearance H exists between the retainer frame 201 and transverse arm 11, representing their maximum separation distance. The positioning pin 4 is configured with a length exceeding first clearance H, thereby preventing extraction of the positioning pin 4 and independent disassembly of the towing head subassembly 202 during storage state, enhancing anti-theft performance of the hitch assembly.

In specific embodiments, the towing head subassembly 202 constitutes a ball head subassembly, such as triple-ball or dual-ball configurations, where the towing head 21 functions as a ball head.

In a particular embodiment, the positioning unit comprises at least two pin shafts providing said positioning members 30. Alternative embodiments may employ other suitable configurations for the positioning unit, such as a U-shaped lock incorporating insertable positioning members 30.

In the description of embodiments herein, the term "and/or" merely describes associative relationships between related objects, indicating three possible scenarios: exclusive existence of A, coexistence of A and B, or exclusive existence of B.

In the description of embodiments herein, unless expressly specified or limited, technical terms including "installed," "connected," "fixed," etc., shall be interpreted broadly. For example, connections may be permanent or detachable; integrations may form unitary structures; connections may be mechanical or electrical; linkages may be direct or indirect via intermediaries; relationships may involve internal communication between components or mutual interactions. Those skilled in the art may interpret these terms contextually.

It shall be understood that references to "along" a specific direction mean having at least a directional component, preferably with an angular deviation within 10°, more preferably within 5°.

The above embodiments solely illustrate the technical solutions of this application without limiting its scope. Although detailed descriptions reference preceding embodiments, skilled practitioners may modify recorded technical solutions or equivalently substitute partial/complete features. Such modifications or substitutions shall not depart from the essence of the technical solutions under this application's scope as defined in claims and specifications. Particularly, absent structural conflicts, technical features across embodiments may be freely combined. This application encompasses all technical solutions falling within the claim scope, not being limited to disclosed specific embodiments.

What is claimed is:
1. A hitch assembly, characterized by comprising:
a connection module comprising:
a connection segment through which the hitch assembly is connected to a towing vehicle; and
a longitudinal arm including a plurality of first positioning grooves and a plurality of second positioning grooves distributed at intervals along an extension direction of the longitudinal arm, the longitudinal arm having oppositely arranged first and second sides, the connection segment being connected to the longitudinal arm at the first side, the plurality of first positioning grooves being formed on the first side, the plurality of second positioning grooves being formed on the second side;
a towing module comprising:

at least one towing head through which a towed object is connected to the hitch assembly; and a pair of first positioning bores located at a first position; and a pair of second positioning bores located at a second position; and a positioning unit providing at least two positioning members for connecting the towing module to the connection module;

wherein when the towing module moves along the extension direction of the longitudinal arm, the pair of first positioning bores are respectively alignable with the first positioning grooves at different locations, and when the first positioning bores align with the first positioning grooves, the pair of second positioning bores simultaneously align with corresponding second positioning grooves, the aligned pair of first positioning bores and first positioning grooves defining a channel for insertion of the positioning members; the aligned pair of second positioning bores and second positioning grooves defining a channel for insertion of the positioning members;

one of the longitudinal arm and the towing module is provided with a sliding channel, and the other has a protrusion;

the protrusion is slidably engaged with the sliding channel to cooperatively guide movement of the towing module along the extension direction of the longitudinal arm.

2. The hitch assembly according to claim 1, characterized in that:

the connection module is an L-shaped bracket, the connection segment being a transverse arm vertically extending from an end of the longitudinal arm, the L-shaped bracket having a space allowing accommodation of the towing module at the first side of the longitudinal arm;

wherein the sliding channel is formed in the longitudinal arm, and the protrusion is a pivot shaft disposed on the towing module.

3. The hitch assembly according to claim 2, characterized in that:

the hitch assembly has an operational state and a storage state, the towing module being located at the second side of the longitudinal arm in the operational state and at the first side of the longitudinal arm in the storage state;

wherein the positioning bores are configured such that:

in the operational state, the pair of first positioning bores are movable to respectively align with first positioning grooves at different locations to form channels, while the pair of second positioning bores simultaneously align with corresponding second positioning grooves to form channels, the positioning members being insertable into the channels to fix the towing module to different positions of the longitudinal arm via the positioning unit;

the towing module pivots relative to the longitudinal arm to transition from the operational state to the storage state, wherein in the storage state, the pair of first positioning bores are movable to align with at least one second positioning groove to form channels, while the pair of second positioning bores align with corresponding first positioning grooves to form channels, the positioning members being insertable into the channels to fix the towing module in the storage state via the positioning unit.

4. The hitch assembly according to claim 3, characterized in that:

the towing module further includes a pair of third positioning bores, which align with remaining first or second positioning grooves in the operational state to form channels allowing insertion of the positioning members;

wherein the first positioning bores, second positioning bores, and third positioning bores are arranged in a triangular pattern on the towing module, with the pivot shaft located within the triangle.

5. The hitch assembly according to claim 2, characterized in that:

the towing module includes a retainer frame and a towing head assembly connected thereto, the retainer frame comprising a main body and a pair of side plates, the towing head assembly being connected to the main body, wherein in an assembled state, the pair of side plates are positioned at widthwise sides of the longitudinal arm, and the protrusions are disposed on the side plates;

the pair of first positioning bores and the pair of second positioning bores are respectively formed in the side plates, and the towing head assembly includes at least one towing head.

6. The hitch assembly according to claim 5, characterized in that:

the towing head assembly includes at least one clearance surface devoid of the towing head;

wherein the towing head assembly is rotatably connected to the retainer frame, enabling the clearance surface to face the transverse arm during storage.

7. The hitch assembly according to claim 6, characterized in that:

the retainer frame includes a first fixing bore and a second fixing bore with mutually perpendicular axes, and the towing head assembly includes a third fixing bore;

when the towing head assembly rotates relative to the retainer frame, the third fixing bore is rotatable to align with either the first or second fixing bore;

the hitch assembly further includes an alignment pin configured to be inserted into aligned third and first fixing bores or third and second fixing bores.

8. The hitch assembly according to claim 7, characterized in that:

the positioning unit includes at least two pins providing the positioning members.

* * * * *